Jan. 14, 1964     J. A. BROWN     3,117,483
SELF ANCHORING BOLT HAVING LINE CONTACT BETWEEN
THE MALE AND FEMALE WEDGE MEMBERS
Filed Sept. 15, 1960

INVENTOR
JOHN ARTHUR BROWN

BY Hane and Nydick
ATTORNEYS

United States Patent Office 3,117,483
Patented Jan. 14, 1964

3,117,483
SELF ANCHORING BOLT HAVING LINE CONTACT BETWEEN THE MALE AND FEMALE WEDGE MEMBERS
John A. Brown, 52 Rainbow Ave., South Broken Hill, New South Wales, Australia
Filed Sept. 15, 1960, Ser. No. 56,197
Claims priority, application Australia Oct. 21, 1959
2 Claims. (Cl. 85—2.4)

This invention relates to those bolts incorporating wedging members which with the wedging members are constructed to be inserted into holes and by manipulating the bolt causing the several wedging members to move relative to one another whereby the bolts are interlocked with the wedges and anchored in the holes.

The invention has been devised to provide a self-anchoring bolt of the type referred to which has only one part to interlock with the bolt head, which can be easily inserted into a hole and anchored therein and, when required, extracted therefrom.

A self-anchoring bolt according to this invention consists of interconnectable male wedge member and complementary female wedge member. The male wedge member has a shank, and a part cylindrical and part tapered head portion. The female wedge member has a part cylindrical outer wall, a tapered inner face complementary to the taper and the head portion of the male member, and means on the tail portion thereof is adapted to have bolt releasing means connected thereto.

The invention will now be described with reference to the annexed drawings, wherein.

Figure 1:
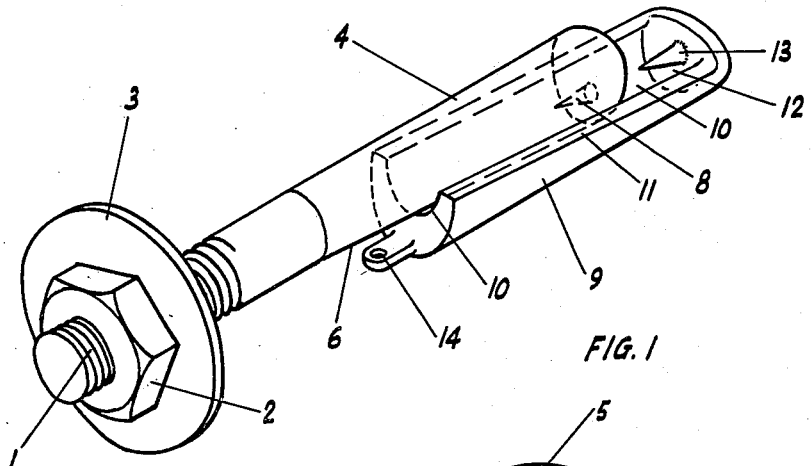
FIGURE 1 is a perspective view of the self-anchoring bolt with a washer and nut on the threaded portion of the shank of the male wedge member.

The male wedge member as illustrated has a threaded shank portion 1 on which are a nut 2 and washer 3. Integral with the shank 1 is a head portion 4 which has a part cylindrical portion indicated at 5 and a part tapered portion indicated at 6. There is a convex enlarged portion 7 on the upper end of the head portion 4 and the tapered portion 6 is also of convex shape and extends inwardly from the enlarged portion 7 to the shank 1. A coupling pin hole 8 is formed in the top of the head portion.

Figure 2:
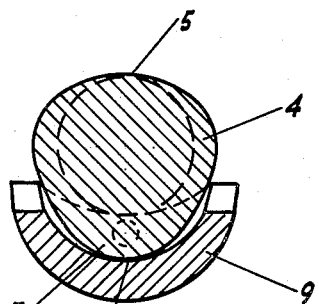
FIGURE 2 is a cross-sectional view taken transversely through the complementary tapered portion of the wedge members.

The female wedge member has a part cylindrical outer wall 9, which may be knurled, and has a tapered concave inner face 10 which is complementary to the convex tapered portion 6 of the male wedge member but is of larger diameter, see particularly FIGURE 2.

The wall thickness of the female wedge member increases towards the lower end thereof and from this thick end, the side edges 11 of the female wedge member slant longitudinally downwardly and terminate in a cap flange 12 which is adapted to project over the top of the head portion 4 of male wedge member. A coupling pin 13 is secured to or formed integrally with the cap flange 12 and projects downwardly from the inner face thereof to register with the hole 8 in the head of the male wedge member.

An eye 14 or other suitable means capable of having a wire 15, hook or the like connected thereto, is formed on or secured to the tail or thick end of the female wedge member.

Figure 3:
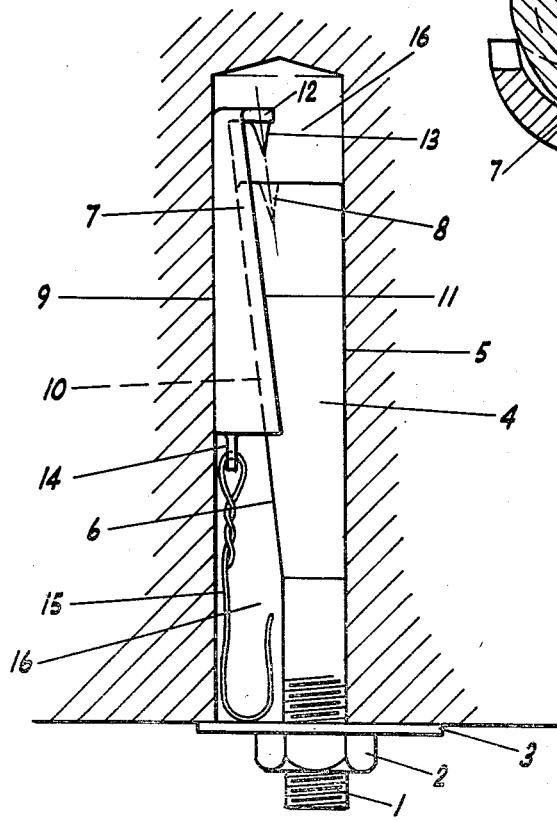
FIGURE 3 is an elevational view thereof, diagrammatically illustrating the bolt being mounted in a hole.

FIGURE 3 illustrates the bolt in a wedged position in a hole 16 and to arrive at this position, the wedge members are assembled together and are inserted in the hole in the assembled position. When the assembled components are located as desired in the hole, the female wedge member is held stationary by the wire 15 or hook and the male wedge member is drawn downwardly or forwardly as the case may be. If a wire 15 is used, it can be left in the hole to facilitate recovery of the bolt, and the nut 2 and washer 3 are emplaced and the nut is tightened.

To recover the bolt, the nut 2 and washer 3 are removed and the wire 15 is held or a hook is connected to the eye 14 to hold the female wedge member stationary. The male wedge member is then driven back into the hole until it is connected to the female wedge member by the pin 13 entering the pin hole 8 and the assembled components are withdrawn simultaneously from the hole 16.

An important feature of the present invention is that there is line contact only and not full face contact between the wedge members when they are in the wedged position, by virtue of the difference in diameter of the convex and concave portions thereof, and this greatly facilitates locking the components and freeing and recovering the components from the working position in a hole.

If desired, the male wedge member may be bored longitudinally axially throughout its length for the purpose of allowing air to escape from a hole when cement slurry is being pumped around the bolt when it is desired to grout the bolt after it has been installed, where the bolt is to be permanently fixed in a hole.

I claim:
1. A self-anchoring bolt to be inserted into a mounting hole, said bolt comprising an elongated male wedge member having peripherally a substantially cylindrical surface portion and an oppositely disposed, substantially convex surface portion tapered along the length thereof, an elongated female wedge member having a cylindrical outer surface portion and an oppositely disposed concave surface portion tapered along the length thereof, the radius of curvature of the concave surface portion of the female wedge member being greater than the radius of curvature of the convex surface portion of the male wedge member, the tapers of the wedge members extending in opposite directions, thereby providing line contact between the convex and the concave surface portions when the male wedge member is received in the female wedge member, and coupling means for releasably coupling said wedge members, said coupling means including a projection extending from the female wedge member and engageable with a receiving opening in the leading end of the male wedge member to retain said members in engaged position, the wedge members being engageable with their cylindrical surface portions with the wall of the mounting hole and being forced radially outward against said wall due to the engagement provided by said line contact when the two wedge members are lengthwise displaced in reference to each other.

2. A self-anchoring bolt according to claim 1, wherein said projection is in the form of a pin, and wherein a cap flange protrudes laterally from the leading end of the female wedge member and supports said pin depending therefrom.

References Cited in the file of this patent

UNITED STATES PATENTS

| | | |
|---|---|---|
| 831,464 | O'Leary | Sept. 18, 1906 |
| 1,034,607 | Frank et al. | Aug. 6, 1912 |
| 1,037,277 | Martin | Sept. 3, 1912 |
| 1,396,398 | Bowman | Nov. 8, 1921 |
| 1,449,624 | Phillips | Mar. 27, 1923 |
| 2,787,931 | McCabe | Apr. 9, 1957 |
| 2,878,668 | Starling | Mar. 24, 1959 |
| 2,903,938 | Strand | Sept. 15, 1959 |
| 3,021,745 | Libom | Feb. 20, 1962 |

FOREIGN PATENTS

| | | |
|---|---|---|
| 208,951 | Australia | Aug. 30, 1956 |
| 775,040 | Great Britain | May 15, 1957 |
| 481,296 | Italy | May 27, 1953 |
| 138,747 | Sweden | Jan. 13, 1953 |